United States Patent
Ito et al.

(10) Patent No.: US 11,912,885 B2
(45) Date of Patent: Feb. 27, 2024

(54) SET OF INK AND TREATMENT AGENT, AND RECORDING METHOD

(71) Applicant: Brother Kogyo Kabushiki Kaisha, Nagoya (JP)

(72) Inventors: Shinpei Ito, Nagoya (JP); Yasuhiro Taga, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1097 days.

(21) Appl. No.: 16/269,072

(22) Filed: Feb. 6, 2019

(65) Prior Publication Data

US 2019/0300743 A1  Oct. 3, 2019

(30) Foreign Application Priority Data

Mar. 30, 2018  (JP) .................. 2018-070307

(51) Int. Cl.
*C09D 11/54* (2014.01)
*B41J 2/01* (2006.01)
(Continued)

(52) U.S. Cl.
CPC ............... *C09D 11/54* (2013.01); *B41J 2/01* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002;
(Continued)

(56) References Cited

U.S. PATENT DOCUMENTS 8,016,404 B2   9/2011  Kato et al.
2003/0070581 A1*  4/2003  Tomioka ............ B41M 7/0018
                                                                 347/100
(Continued)

FOREIGN PATENT DOCUMENTS

JP     2003-127351 A    5/2003
JP     2004-195961 A    7/2004
(Continued)

OTHER PUBLICATIONS

Oct. 26, 20216—(JP) Noice of Reasons for Refusal—App 2018-070307, Eng Tran.
(Continued)

*Primary Examiner* — Manish S Shah
(74) *Attorney, Agent, or Firm* — Banner & Witcoff, Ltd.

(57) ABSTRACT

There is provided a set including: a water-based ink for ink-jet recording including a dye and water; and a treatment agent including a cationic polymer emulsion which includes a cationic polymer including a urethane structure. There is provided a recording method for recording on a recording medium which is fabric or recording paper by using the set.

19 Claims, 4 Drawing Sheets

(51) Int. Cl.
*B41J 2/21* (2006.01)
*C09D 11/328* (2014.01)
*D06P 1/39* (2006.01)
*D06P 1/44* (2006.01)
*D06P 1/52* (2006.01)
*D06P 1/651* (2006.01)
*D06P 5/30* (2006.01)

(52) U.S. Cl.
CPC .............. *C09D 11/328* (2013.01); *D06P 1/39* (2013.01); *D06P 1/445* (2013.01); *D06P 1/5285* (2013.01); *D06P 1/65118* (2013.01); *D06P 5/30* (2013.01)

(58) Field of Classification Search
CPC .... B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436
See application file for complete search history.

(56) References Cited

U.S. PATENT DOCUMENTS

| | | | | |
|---|---|---|---|---|
| 2003/0107632 A1* | 6/2003 | Arita | ...................... | C09D 11/40 347/100 |
| 2004/0011247 A1* | 1/2004 | Taguchi | ................. | C09D 11/38 347/100 |
| 2004/0094064 A1* | 5/2004 | Taguchi | ................. | C09D 11/32 106/31.3 |
| 2004/0100542 A1* | 5/2004 | Chen | ...................... | B41J 2/2114 347/95 |
| 2004/0109052 A1 | 6/2004 | Suzuki et al. | | |
| 2004/0155947 A1* | 8/2004 | Ozawa | ................. | C09D 11/328 347/100 |
| 2004/0173120 A1* | 9/2004 | Tsuru | ..................... | C09D 11/40 106/31.89 |
| 2004/0179066 A1* | 9/2004 | Arita | ...................... | C09D 11/32 347/100 |
| 2004/0187738 A1* | 9/2004 | Taguchi | ............... | C09D 11/328 106/31.52 |
| 2005/0012798 A1* | 1/2005 | Adachi | ................ | C09D 11/322 347/100 |
| 2005/0036018 A1* | 2/2005 | Yanagihara | ............... | D06P 5/30 347/100 |
| 2005/0174411 A1* | 8/2005 | Adachi | ................ | B41M 5/0017 347/100 |
| 2007/0120920 A1* | 5/2007 | Taguchi | ................. | C09D 11/40 106/31.47 |
| 2007/0222811 A1* | 9/2007 | Yanagi | .................... | B41J 2/2114 347/98 |
| 2008/0241398 A1* | 10/2008 | Kato | ...................... | C09D 11/54 427/256 |
| 2010/0080909 A1 | 4/2010 | Nakano | | |
| 2011/0200751 A1* | 8/2011 | Yatake | ................... | C09D 11/54 977/773 |
| 2011/0234690 A1* | 9/2011 | Ooishi | ................. | C09D 11/322 524/238 |
| 2011/0242199 A1* | 10/2011 | Nishimura | .......... | C09D 11/322 524/502 |
| 2013/0027451 A1* | 1/2013 | Li | .......................... | C09D 11/30 524/547 |
| 2013/0182055 A1 | 7/2013 | Maeda et al. | | |
| 2014/0099453 A1 | 4/2014 | Herlambang et al. | | |
| 2015/0035896 A1* | 2/2015 | Gotou | ........................ | B41J 2/01 347/20 |
| 2015/0273885 A1* | 10/2015 | Imai | ......................... | B41J 2/01 347/21 |
| 2015/0275004 A1* | 10/2015 | Imai | ..................... | C09D 11/322 524/440 |
| 2016/0318299 A1* | 11/2016 | Arai | .......................... | B41J 2/01 |
| 2019/0085193 A1 | 3/2019 | Ushiku | | |
| 2019/0301084 A1* | 10/2019 | Ito | .......................... | B41J 2/2107 |

FOREIGN PATENT DOCUMENTS

| | | | |
|---|---|---|---|
| JP | 2004-256694 A | 9/2004 | |
| JP | 2005-132917 A | 5/2005 | |
| JP | 2007-276392 A | 10/2007 | |
| JP | 2008-246821 A | 10/2008 | |
| JP | 2010-023265 A | 2/2010 | |
| JP | 2010023265 A * | 2/2010 | ......... B41M 5/0017 |
| JP | 2010-82959 A | 4/2010 | |
| JP | 2010-115854 A | 5/2010 | |
| JP | 2011-025504 A | 2/2011 | |
| JP | 2012-16928 A | 1/2012 | |
| JP | 2013-147558 A | 8/2013 | |
| JP | 2014-94559 A | 5/2014 | |
| JP | 2015-98157 A | 5/2015 | |
| JP | 2018-16662 A | 2/2018 | |
| JP | 2018-083299 A | 5/2018 | |
| WO | 2017/159124 A1 | 9/2017 | |

OTHER PUBLICATIONS

May 10, 2022—(JP) Notice of Reasons for Refusal—App 2018-070307, Eng Tran.

* cited by examiner

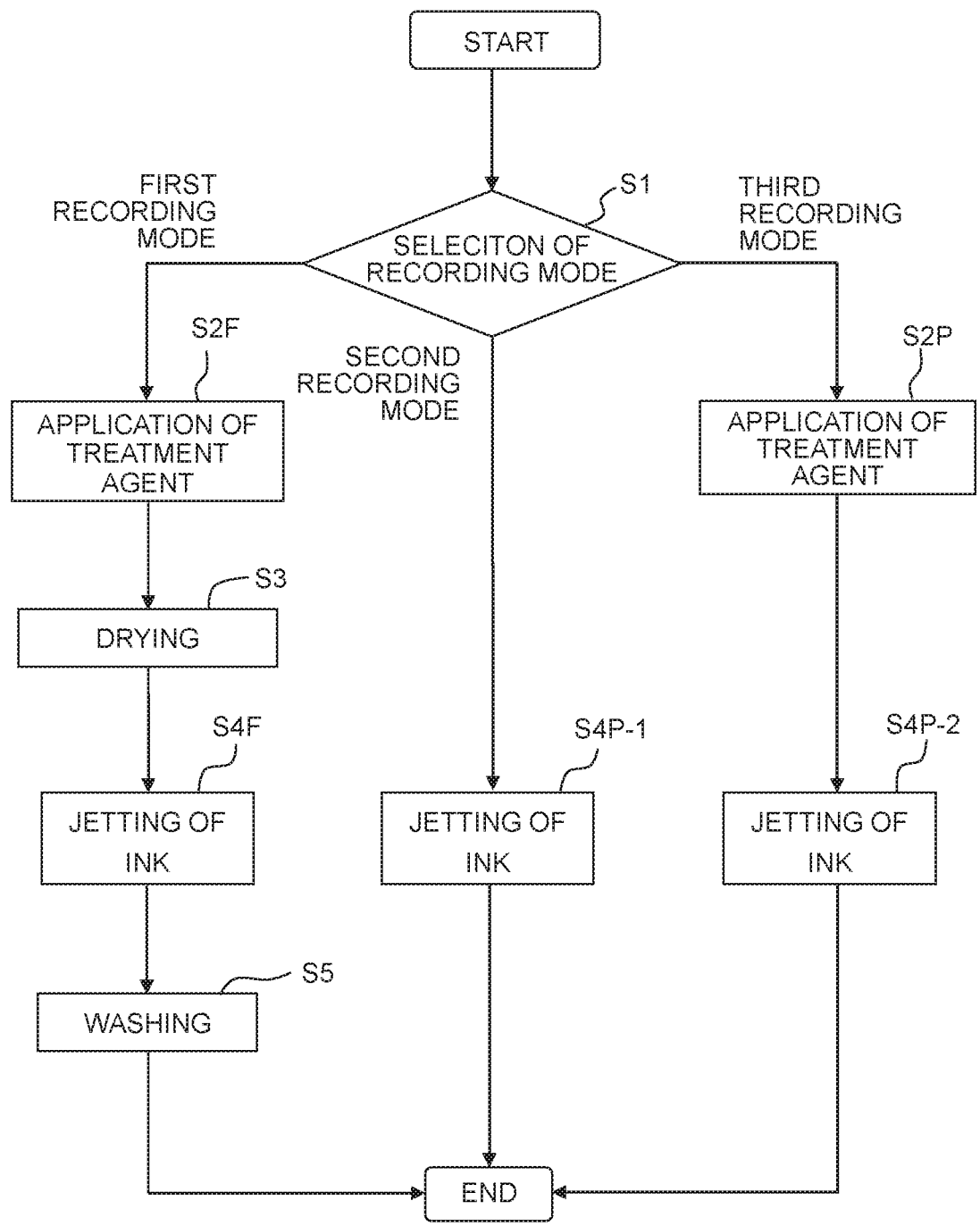

SET OF INK AND TREATMENT AGENT, AND RECORDING METHOD

CROSS REFERENCE TO RELATED APPLICATION

The present application claims priority from Japanese Patent Application No. 2018-070307 filed on Mar. 30, 2018 the disclosure of which is incorporated herein by reference in its entirety.

BACKGROUND

Field of the Invention

The present invention relates to a set of an ink and a treatment agent, and a recording method.

Description of the Related Art

An ink-jet recording method has been suggested, in which printing is performed by using a water-based ink containing a dye (hereinafter referred to as "water-based dye ink" in some cases) on regular paper such as sheets of copy paper, report pad, etc. (Japanese Patent Application Laid-open No. 2003-127351).

However, a new ink-jet recording method is demanded, which also makes it possible to perform recording on a recording medium such as cloth (fabric), etc., which is different from the recording paper such as the regular paper, etc., in addition to the recording on the recording paper. In this situation, merely using the water-based dye ink, which is intended for use in the recording paper, also for the recording on the fabric causes any color loss in a case that the fabric is washed with water. Further, it is also required that the color change is small between a case that recording is performed on the recording paper and a case that recording is performed on the fabric (the difference between color of recorded matter of recording paper and color of recorded matter of fabric is small), and it is required that, in the case that the recording is performed on the fabric, the change in texture or tactile sensation such as feel by hand and feel by skin in the fabric is small before and after the recording.

In view of the above situation, an object of the present teaching is to provide a set including a water-based ink for ink-jet recording and a treatment agent, the set being usable both for recording on recording paper and recording on any other recording medium different from the recording paper.

SUMMARY

According to a first aspect of the present teaching, there is provided a set including:

a water-based ink for ink-jet recording including a dye and water; and a treatment agent including a cationic polymer emulsion which includes a cationic polymer including a urethane structure.

According to a second aspect of the present teaching, there is provided a recording method for recording on a recording medium which is fabric or recording paper by using the set of the first aspect, the recording method including, in a case that the recording medium is the fabric:

applying the treatment agent to the fabric; and jetting the water-based ink onto the fabric by an ink-jet system.

BRIEF DESCRIPTION OF THE DRAWINGS

FIG. 4 is a flow chart indicating the recording method of the present teaching.

DESCRIPTION OF THE EMBODIMENTS

[Set of Ink and Treatment Agent]

Figure 1:
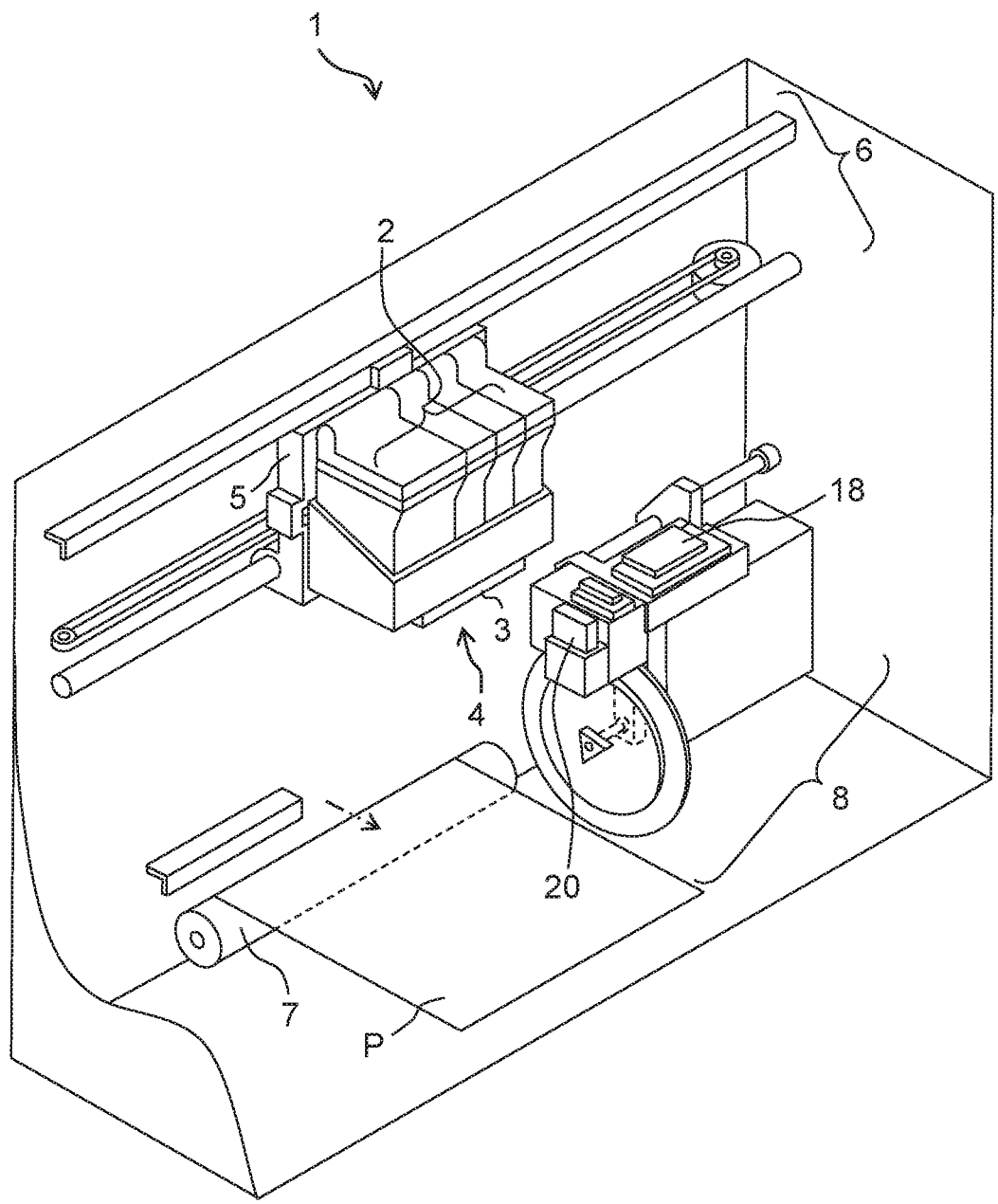
FIG. 1 is a schematic perspective view of an example of the configuration of an ink-jet recording apparatus of the present teaching.

An explanation will be given about a set of an ink and a treatment agent of the present teaching. The set of the ink and the treatment agent of the present teaching is a set of a water-based ink for ink-jet recording (hereinafter referred also to as a "water-based ink" or "ink" in some cases) and a treatment agent. In the set of the ink and the treatment agent of the present teaching, the water-based ink may be one kind of the water-based ink, or may be two or more kinds of the water-based ink.

<Water-Based Ink>

First, the water-based ink will be explained. The water-based ink includes a dye and water.

The dye is not specifically limited, and is exemplified, for example, by a direct dye, an acidic dye, a basic dye, a reactive dye, a food dye, etc. Specific examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green; C. I. Acid Black, C. I. Acid Blue, C. I. Acid Red, C. I. Acid Yellow, C. I. Acid Orange, C. I. Acid Violet; C. I. Basic Black, C. I. Basic Blue, C. I. Basic Red, C. I. Basic Violet; C. I. Reactive Blue, C. I. Reactive Red, C. I. Reactive Yellow; C. I. Food Black, C. I. Food Red, C. I. Food Yellow; and the like. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc. The C. I. Basic Black is exemplified, for example, by C. I. Basic Black 2, etc. The C. I. Basic Blue is exemplified, for example, by C. I. Basic Blues 1, 3, 5, 7, 9, 24, 25, 26, 28, 29, etc. The C. I. Basic Red is exemplified, for example, by C. I. Basic Reds 1, 2, 9, 12, 13, 14, 37, etc. The C. I. Basic Violet is exemplified, for example, by C. I. Basic Violets 7, 14, 27, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

The dye includes, for example, at least one of the direct dye and the acidic dye. Each of the direct dye and the acidic dye is an anionic dye. The anionic dye interact easily with the cationic emulsion included in the treatment agent. With this, the water resistance of the recorded matter (fabric) is enhanced, and the any color loss in the recorded matter after being washed with water is further suppressed. Among the above-described specific examples of the dye, C. I. Direct Black, C. I. Direct Blue, C. I. Direct Red, C. I. Direct Yellow, C. I. Direct Orange, C. I. Direct Violet, C. I. Direct Brown and C. I. Direct Green correspond to the direct dye; C. I. Acid Black, C. I. Acid Blue, C. I. Acid Red, C. I. Acid Yellow, C. I. Acid Orange and C. I. Acid Violet correspond to the acidic dye.

In the water-based ink, the dye may include, for example, at least one selected from the group consisting of: an azo dye, an anthrapyridone dye and a phthalocyanine dye.

It is allowable that one kind of the dye as described above is used singly, or two or more kinds of the dye are used in combination. The content amount of the dye in an entire amount of the water-based ink is, for example, in a range of 0.1% by mass to 20% by mass, in a range of 1% by mass to 15% by mass, or in a range of 2% by mass to 10% by mass.

The water is preferably ion-exchange water or purified water (pure water). The content amount of the water in the entire amount of the water-based ink is, for example, in a range of 10% by mass to 90% by mass, in a range of 40% by mass to 80% by mass, or in a range of 50% by mass to 80% by mass. The content amount of the water in the entire amount of the water-based ink may be, for example, a balance of the other components.

The water-based ink may further include a water-soluble organic solvent. The water-soluble organic solvent is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran and dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The content amount of the humectant in the entire amount of the water-based ink is, for example, in a range of 0% by mass to 95% by mass, in a range of 5% by mass to 80% by mass, or in a range of 5% by mass to 50% by mass.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the ink is, for example, in a range of 0% by mass to 20% by mass, in a range of 0% by mass to 15% by mass, or in a range of 1% by mass to 4% by mass.

The water-based ink may further include a conventionally known additive, as necessary. The additive is exemplified, for example, by surfactants, viscosity-adjusting agents, pH-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the dye and the water, and an optionally other additive(s) as necessary, by a conventionally known method, and then removing any non-dissolved matter, with a filter, etc.

<Treatment Agent>

Next, the treatment agent will be explained. The treatment agent includes a cationic polymer emulsion including a urethane structure.

The cationic polymer emulsion is composed, for example, of particles of a cationic polymer (minute or fine particles of resin; resin fine particles) and a dispersion medium (for example, water, etc.), and the resin fine particles are not in a dissolved state with respect to the dispersion medium; rather, the resin fine particles are dispersed in the dispersion medium with a predetermined particle diameter. Namely, the cationic polymer emulsion includes the dispersion medium and the particles of the cationic polymer dispersed in the dispersion medium. The cationic polymer emulsion is capable of including a cationic polymer which is insoluble or hardly soluble in water. Namely, the treatment agent including the cationic polymer emulsion of the present teaching improves the water resistance of a fabric after recording (printer matter) and suppresses any color loss of the recorded matter after being washed wish water, as compared, for example, with a treatment agent including a water-soluble cationic polymer which does not form the emulsion.

The cationic polymer included in the cationic polymer emulsion includes, for example, a cationic functional group such as an organic amine.

The cationic polymer emulsion of the present teaching includes a urethane structure. Namely, the cationic polymer included in the cationic polymer emulsion includes (has) the urethane structure. With this, any change in the tactual sensation such as feel by hand, feel by skin, etc., before and after the recording is made to be small. In the cationic polymer emulsion including the urethane structure (hereinafter referred also to as "cationic urethane emulsion", in some cases), the urethane structure may be an ester-based urethane structure. Namely, the cationic polymer may include the ester-based urethane structure. In a case that the urethane structure is the ester-based urethane structure, a change in the tactual sensation such as feel by hand, feel by skin, etc., in the fabric between before and after the recording is smaller in recording on the fabric.

The minimum film formation temperature (minimum film-forming temperature) of the cationic urethane emulsion is preferably not more than 40° C. The minimum film formation temperature of the cationic urethane emulsion may be, for example, not more than 20° C., or not more than 5° C. The term "minimum film-forming temperature" in the present teaching means a temperature which is minimally required for the polymer emulsion to form a film by being heated. The minimum film-forming temperature can be measured, for example, pursuant to "Determination of Minimum Film-forming Temperature" of JIS K 6828-2:2003, corresponding to ISO 2115: 1996. Specifically, the minimum film-forming temperature can be measured, for example, as follows. The polymer emulsion is coated on an aluminum plate imparted with temperature gradient. A temperature at a point of the aluminum plate, at which a dry coating film is formed, is measured as the minimum film-forming temperature by an apparatus for measuring minimum film forming temperature. An example of the apparatus for measuring minimum film forming temperature includes, for example, "Minimum Film Forming Temperature Bar 90" produced by PHOPOINT INSTRUMENTS LTD., etc.

The cationic urethane emulsion may be privately prepared in-house, or any commercially available product may be used therefor. The commercially available product is exemplified, for example, by "MOWINYL (trade name) 6910" (cationic urethane emulsion wherein the urethane structure is ester-based) manufactured by JAPAN COATING RESIN CO., LTD.; "SUPERFLEX (trade name) 620" (cationic urethane emulsion wherein the urethane structure is ester-based), "SUPERFLEX (trade name) 650" manufactured by DKS CO., LTD (DAI-ICHI KOGYO SEIYAKU CO., LTD); and the like. One kind of the cationic urethane emulsion as described above may be used singly, or two or more kinds of the cationic urethane emulsion as described above may be used in combination.

The average particle diameter (particle size) of the cationic urethane emulsion, namely, the average particle diameter of the particles of the cationic polymer included in the cationic urethane emulsion is, for example, in a range of 100 nm to 300 nm. The average particle diameter can be measured, for example, by performing measurement using a dynamic light scattering particle diameter distribution measuring apparatus "LB-500" manufactured by HORIBA, LTD., as the number length mean diameter.

The cationic urethane emulsion preferably includes at least one of an acrylic structure and a styrene structure in a part, of the cationic urethane emulsion, which is different from the urethane structure, and more preferably includes the acrylic structure in the part different from the urethane structure (is more preferably a urethane acrylic emulsion). Among the above-described commercially available products, "MOWINYL (trade name) 6910", "SUPERFLEX (trade name) 620", and "SUPERFLEX (trade name) 650" each correspond to the urethane acrylic emulsion.

A ratio of the part which is urethane structure (a ratio of occupation of the urethane structure, or a ratio of the urethane structure) is preferably not less than 10% by mass, more preferably not less than 20% by mass in the cationic urethane emulsion. Note that the phrase "ratio of the urethane structure" means a ratio of the urethane structure in a solid content of the cationic urethane emulsion (in the cationic polymer including the urethane structure). The urethane structure is preferably a part obtained, for example, from aliphatic isocyanate and polyether-based polyol or polyester-based polyol.

The content amount of the cationic urethane emulsion in the entire amount of the treatment agent is, for example, in a range of 1% by mass to 40% by mass, in a range of 2% by mass to 25% by mass, or in a range of 2.5% by mass to 20% by mass. In a case that the content amount is made to be not less than 2.5% by mass, the water resistance of a recorded matter (fabric) is further excellent in the recording on fabric. Further, in a case that the content amount is made to be not more than 20% by mass, the color change (difference between color of recorded matter of recording paper and color of recorded matter of fabric) is smaller between the case that recording is performed on the recording paper and the case that recording is performed on the fabric; and that, in the case that the recording is performed on the fabric, the change in texture or tactile sensation, such as hand feeling, feel by skin, etc., between before and after recording is smaller. Note that the content amount is a solid content amount of the cationic urethane emulsion in the entire amount of the treatment agent. Namely, the content amount is a content amount of the cationic polymer including the urethane structure, which is included in the cationic urethane emulsion, in the entire amount of the treatment agent.

It is allowable that the treatment agent includes a cationic polymer emulsion not including the urethane structure, or that the treatment agent does not. However, in view of the suppressing any change in texture or tactile sensation, such as hand feeling, feel by skin, etc., between before and after recording, it is preferred that a content amount (% by mass) of the cationic polymer emulsion not including the urethane structure in the entire amount of the treatment agent is less than the content amount (% by mass) of the cationic polymer emulsion including the urethane structure (cationic polymer urethane emulsion) in the entire amount of the treatment agent. From a similar viewpoint, it is preferred that the treatment agent does not substantially include the cationic polymer emulsion not including the urethane structure. In the treatment agent, the ratio of the solid content amount of the cationic urethane emulsion to the total solid content amounts of all the cationic polymer emulsions in the entire amount of the treatment agent is, for example, not less than 50% by mass, not less than 90% by mass, or is 100% by mass.

The treatment agent may further include a water-soluble organic solvent. The water-soluble organic solvent is exemplified, for example, by a humectant.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The content amount of the humectant in the entire amount of the treatment agent is, for example, in a range of 0% by mass to 80% by mass, in a range of 1% by mass to 60% by mass, or in a range of 5% by mass to 50% by mass.

The treatment agent may further include a water-soluble organic solvent which is different from the humectant. The water-soluble organic solvent which is different from the humectant is exemplified, for example, by a penetrant which adjusts the drying velocity on the recording medium, etc.

It is allowable to use, for example, a penetrant which is similar to those as exemplified in relation to the above-described water-based ink. One kind of the penetrant may be used singly, or two or more kinds of the penetrant may be used in combination. The content amount of the penetrant in the entire amount of the treatment agent is, for example, in a range of 0% by mass to 20% by mass, in a range of 0% by mass to 15% by mass, or in a range of 1% by mass to 4% by mass.

The water-soluble organic solvent may be a glycol-based water-soluble organic solvent of which boiling point is not more than 200° C. The glycol-based water-soluble organic solvent of which boiling point is not more than 200° C. is exemplified, for example, by ethylene glycol (boiling point: 196° C.), propylene glycol (boiling point: 188° C.), 1,2-butanediol (boiling point: 194° C.), 2,3-butanediol (boiling point: 183° C.), and the like. Among the above-described glycol-based water-soluble organic solvent of which boiling point is not more than 200° C., the propylene glycol is preferred since the propylene glycol is safe to human body and has an excellent balance between the wettablity and volatility. One kind of the glycol-based water-soluble organic solvent of which boiling point is not more than 200° C. as described above may be used singly, or two or more kinds of the glycol-based water-soluble organic solvent of which boiling point is not more than 200° C. as described above may be used in combination.

In the treatment agent, the ratio of the content amount of the glycol-based water-soluble organic solvent of which boiling point is not more than 200° C. in the entire amount of the water-soluble organic solvent is, for example, not less than 80% by mass, not less than 95% by mass, or 100% by mass. It is allowable that the water-soluble organic solvent includes substantially only the glycol-based water-soluble organic solvent of which boiling point is not more than 200° C.

The treatment agent may further include water. The water is preferably ion-exchange water or purified water (pure water). The content amount of the water in the entire amount of the treatment agent is, for example, in a range of 10% by mass to 90% by mass, in a range of 20% by mass to 80% by mass, is not less than 40% by mass, or in a range of 40% by mass to 80% by mass. The content amount of the water in the entire amount of the treatment agent may be, for example, a balance of the other components.

The treatment agent may further include at least one, or both, of a nonionic surfactant and a cationic surfactant.

The cationic surfactant described above is exemplified, for example, by quaternary ammonium salt, quaternary ammonium ion, primary, secondary, and tertiary amine salt type compounds, alkylamine salt, dialkylamine salt, aliphatic amine salt, alkylpyridinium salt, imidazolinium salt, sulfonium salt, phosphonium salt, onium salt, etc. Specified examples of the cationic surfactant other than the quaternary ammonium salt and the quaternary ammonium ion are exemplified, for example, by hydrochlorides and acetates of laurylamine, palm amine, rosin amine and the like, cetylpyridinium chloride, cetylpyridinium bromide, dihydroxyethyllaurylamine, etc.

The quaternary ammonium salt is exemplified, for example, by a cationic compound represented by the following formula (1).

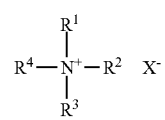

(1)

In the formula (1), $R^1$ to $R^4$ are hydrocarbon groups each having 1 to 30 carbon atoms. $R^1$ to $R^4$ may be identical with one another or different from one another, and $X^-$ is an anion.

In the formula (1), $R^1$ to $R^3$ may be alkyl groups each having 1 to 5 carbon atoms. The alkyl group having 1 to 5 carbon atoms may have a straight chain or a branched chain, and can be exemplified, for example by: methyl group, ethyl group, n-propyl group, isopropyl group, n-butyl group, sec-butyl group, isobutyl group, tert-butyl group, n-pentyl group, isopentyl group, sec-pentyl group, 3-pentyl group, tert-pentyl group, etc. The alkyl group having 1 to 5 carbon atoms may have a substituent group such as halogen atom, etc. In the formula (1), $R^1$ to $R^3$ may be identical with one another or different from one another.

In the formula (1), $R^4$ may be an alkyl group having 6 to 30 carbon atoms. The alkyl group having 6 to 30 carbon atoms is exemplified, for example, by hexyl group, heptyl group, octyl group, nonyl group, decyl group, lauryl group (dodecyl group), tetradecyl group, cetyl group (hexadecyl group), etc. The alkyl group having 6 to 30 carbon atoms may have a substituent group such as halogen atom, etc., and may have either a straight chain or a branched chain.

In the formula (1), X⁻ is an anion. Although the anion may be any anion, the anion may be exemplified, for example, by methylsulfate ion, ethylsulfate ion, sulfate ion, nitrate ion, acetate ion, dicarboxylate (for example, malate, itaconate and the like) ion, tricarboxylate (for example, citrate and the like) ion, hydroxide ion, halide ion, etc. In a case that X⁻ is dicarboxylate ion or tricarboxylate ion, dicarboxylate ion or tricarboxylate ion is the counter ion for two or three quaternary ammonium ions (cations obtained by removing X⁻ from the formula (1)).

The cationic compound represented by the formula (1) is exemplified, for example, by lauryltrimethylammonium sulfate, lauryltrimethylammonium chloride, cetyltrimethylammonium chloride, benzyldimethylalkylammonium chloride, etc. The cationic compound represented by the formula (1) may be privately prepared in-house, or any commercially available product may be used therefor. The commercially available product is exemplified, for example, by "Catiogen (trade name) TML", "Catiogen (trade name) TMP", and "Catiogen (trade name) ES-O" produced by DAI-ICHI KOGYO SEIYAKU CO., LTD. and "Benzalkonium chloride" produced by TOKYO KASEI KOGYO CO., LTD.

The quaternary ammonium ion is exemplified, for example, by a cation obtained by removing X⁻ from the formula (1).

It is allowable to use, as the nonionic surfactant, a commercially available product. The commercially available product is exemplified, for example, by nonionic surfactants produced by LION SPECIALTY CHEMICALS CO., LTD., including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc.; nonionic surfactants produced by KAO CORPORATION, including "EMULGEN (trade name)" series, "RHEODOL (trade name)" series, "EMASOL (trade name)" series, "EXCEL (trade name)" series, "AMIET (trade name)" series, "AMINON (trade name)" series, etc.; nonionic surfactants produced by NISSHIN CHEMICAL CO., LTD., including "OLFIN (trade name)" series, etc.; and the like.

The content amount of at least one of the cationic surfactant and the nonionic surfactant in the entire amount of the treatment agent is, for example, in a range of 0.05% by mass to 20% by mass, in a range of 0.1% by mass to 10% by mass, or in a range of 0.2% by mass to 5% by mass. Note that the content amount is an effective ingredient amount.

It is preferred that the treatment agent does not substantially include an anionic surfactant. There is fear that the anionic surfactant might interact with the cationic urethane emulsion, which might in turn hinder or adversely affect the interaction between the cationic urethane emulsion and the dye in the ink. The content amount of the anionic surfactant in the entire amount of the treatment agent is, for example, 0% by mass or in a range of 0% by mass to 0.01% by mass.

The treatment agent may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

It is preferred that the treatment agent does not substantially include any colorant such as a dye, a pigment, etc., so as not to affect the color (hue) of a printed matter (printed article, printed product). The content amount of the colorant in the entire amount of the treatment agent is, for example, in a range of 0% by mass to 1% by mass, or in a range of 0% by mass to 0.1% by mass.

The treatment agent can be prepared, for example, by uniformly mixing the cationic urethane emulsion, and an optionally other additive(s) as necessary, by a conventionally known method. The treatment agent may be, for example, an aqueous treatment agent (treatment agent-liquid) or a gel treatment agent. In a case that the treatment agent is the aqueous treatment agent (treatment agent-liquid) or the gel treatment agent, the treatment agent can be easily coated on (applied to) the recording medium.

The viscosity of the treatment agent is, for example, not more than 100 Pa·s, not more than 20 Pa·s, or not more than 10 Pa·s. The viscosity is a value measured at 25° C.

As described above, it is preferred that the treatment agent in the set of the present teaching includes the cationic urethane emulsion. On the other hand, it is preferred that the water-based ink does not substantially include the cationic polymer. In a case that the water-based ink contains the cationic polymer, the cationic polymer in the water-based ink interacts with the dye in the water-based ink, which in turn leads to such a fear that the interaction between the dye in the water-based ink and the cationic urethane emulsion in the treatment agent might be hindered or adversely affected. It is preferred that the solid content amount (% by mass) of the cationic polymer in the entire amount of the water-based ink is not more than the solid content amount (% by mass) of the cationic polymer emulsion in the entire amount of the treatment agent. The solid content amount (% by mass) of the cationic polymer in the entire amount of the water-based ink is, for example, 0% by mass, not more than 0.1% by mass, or is not more than 0.01% mass.

As described above, it is preferred that the treatment agent in the set of the present teaching includes the glycol-based water-soluble organic solvent of which boiling point is not more than 200° C. On the other hand, the content amount (% by mass) of the glycol-based water-soluble organic solvent of which boiling point is not more than 200° C. in the entire amount of the water-based ink is not more than the content amount (% by mass) of the glycol-based water-soluble organic solvent of which boiling point is not more than 200° C. in the entire amount of the treatment agent, for the reason that the water-based ink preferably includes a humectant having a higher wettability, instead of including the glycol-based water-soluble organic solvent of which boiling point is not more than 200° C. It is preferred that the water-based ink does not substantially includes the glycol-based water-soluble organic solvent of which boiling point is not more than 200° C., in particular, propylene glycol. The content amount of the glycol-based water-soluble organic solvent of which boiling point is not more than 200° C. in the entire amount of the water-based ink is, for example, 0% by mass, not more than 5% by mass, or not more than 10% by mass.

As described above, the set of the ink and the treatment agent of the present teaching includes the water-based dye ink and the treatment agent including the cationic polymer emulsion which includes the cationic polymer including the urethane structure, and thus the set is usable both for the recording on recording paper and the recording on any other recording medium different from the recording paper.

[Treatment Agent]

Next, the treatment agent of the present teaching will be explained. The treatment agent of the present teaching is a treatment agent usable in the set of the ink and the treatment agent of the present teaching, and is characterized by including a cationic polymer emulsion including a urethane structure. The treatment agent of the present teaching is similar to the above-described treatment agent of the present teaching in the set of the ink and the treatment agent of the present teaching, and thus the explanation for the above-described treatment agent in the set of the present teaching can be quoted herein by reference.

[Recording Method and Ink-Jet Recording Apparatus]

Next, an explanation will be given about a recording method of the present teaching.

The recording method of the present teaching is a recording method for recording on a recording medium including fabric and recording paper (recording medium which is fabric or recording paper) by using the set of the ink and the treatment agent of the present teaching, the recording method including: recording on the recording medium by jetting the water-based ink onto the recording medium by an ink-jet system (a step for recording). In a case that the recording medium is the fabric, the recording method further comprising: applying the treatment agent to the fabric (a step for applying the treatment agent). The recording includes printing a letter (text), printing an image, printing, etc.

In the recording method of the present teaching, the fabric includes both of knit and textile. The material of the fabric may be either natural fiber or synthetic fiber. The natural fiber is exemplified, for example, by cotton, silk, etc. The synthetic fiber is exemplified, for example, by polyester, nylon and acrylic fibers, etc.

The recording method of the present teaching can be carried out, for example, by using an ink-jet recording apparatus of the present teaching which is explained in the following.

The ink-jet recording apparatus of the present teaching includes: an ink set accommodating section; a treatment agent applying mechanism; an ink jetting (discharging) mechanism (ink-jet head); and a controlling mechanism (controller). The set of the ink and the treatment agent of the present teaching is accommodated in the ink set accommodating section; the treatment agent composing the above-described set of the ink and the treatment agent is applicable to a recording medium by the treatment agent applying mechanism; and the water-based ink composing the above-described set of the ink and the treatment agent is jetted onto the recording medium by the ink jetting mechanism. The controlling mechanism is configured to control application of the treatment agent by the treatment agent applying mechanism, depending on a kind of the recording medium. Further, the controlling mechanism is configured to control the ink jetting mechanism so as to also jet the water-based ink.

FIG. 1 depicts an example of the configuration of the ink-jet recording apparatus of the present teaching. As depicted in FIG. 1, an ink-jet recording apparatus 1 includes, as main constitutive components, four ink cartridges (ink containers) 2, an ink jetting (discharging) mechanism (ink-jet head) 3, a head unit 4, a carriage 5, a driving unit 6, a platen roller 7, and a purge device 8. In addition, although not depicted in FIG. 1, the ink-jet recording apparatus 1 includes the treatment agent applying mechanism and the controlling mechanism (controller) at appropriate positions, respectively. Further, although not depicted in FIG. 1, the ink-jet recording apparatus 1 may further include a drying mechanism (which will be described later on) at an appropriate position.

Each of the four ink cartridges 2 contains one color ink of four water-based color inks which are yellow, magenta, cyan, and black inks. For example, at least one of the four color water-based inks is the water-based ink composing the set of the ink and the treatment agent of the present teaching.

In this exemplary embodiment, a set of the four ink cartridges 2 are depicted. However, in place of this four-ink cartridge set, it is also allowable to use an integrated type ink cartridge in which the interior thereof is comparted so that a water-based yellow ink accommodating section, a water-based magenta ink accommodating section, a water-based cyan ink accommodating section, and a water-based black ink accommodating section are formed. As a main body of the ink cartridge, for example, any conventionally known main body of an ink cartridge may be used.

The ink-jet head 3 disposed on the head unit 4 performs recording on a recording medium such as, for example, recording paper (recording paper sheet or recording sheet) P. Note that the recording medium may be a recording medium other than (different from) the recording paper P, such as fabric, etc. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of recording (image printing, image recording), so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 with tubes, etc., and the water-based inks are supplied from the four ink cartridges 2 via the tubes, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

The recording using the ink-jet recording apparatus 1 is performed, for example, in the following manner.

Figure 3A:
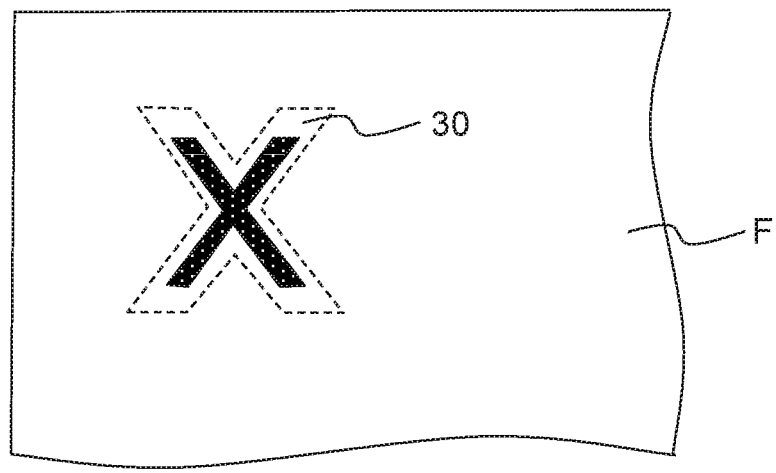
FIGS. 3A and 3B are each a view depicting an example of application of a treatment agent in a recording method of the present teaching.
Figure 3B:
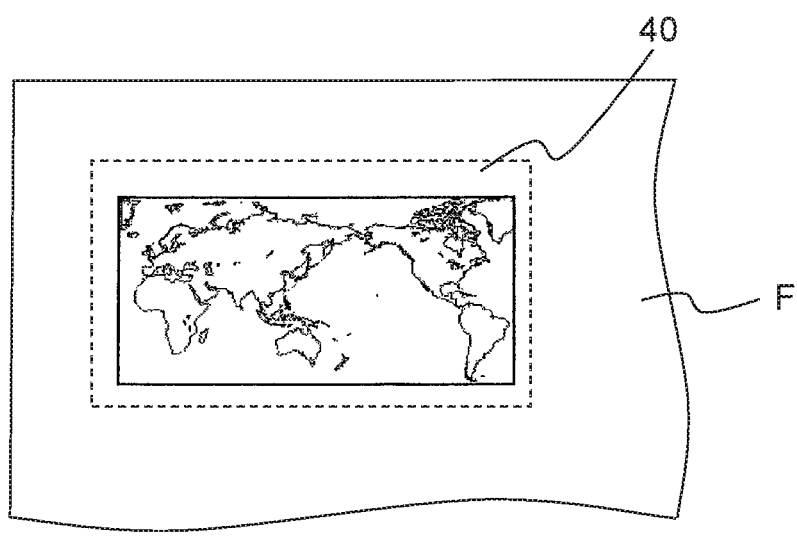

At first, the controlling mechanism controls the application of the treatment agent by the treatment agent applying mechanism, depending on the kind of the recording medium. Specifically, in a case that the recording medium is a fabric, the controlling mechanism selects the application of the treatment agent to the fabric. On the other hand, in a case that the recording medium is a recording medium different from the fabric such as a recording paper, etc., for example, the controlling mechanism allows a user to arbitrarily select whether or not the treatment agent is to be applied to the recording medium different from the fabric. In a case that the user selects application of the treatment agent to the recording medium different from the fabric, the controller mechanism controls the treatment agent applying mechanism so that the treatment agent is applied to the recording paper, etc. Further, in a case that the user select non-application of the treatment agent to the recording paper, etc., the controller mechanism controls the treatment agent applying mechanism so that the treatment agent is not applied to the recording paper, etc. The application of the treatment agent can be performed, for example, by means of a spray system, stamp application, brush application, roller application, dipping (immersion in the treatment agent), the ink-jet system, etc. The treatment agent may be applied to the entirety (entire surface) or a part of a recording surface of the fabric. In a case that the treatment agent is applied to the part of the recording surface, at least a recording portion, of the recording surface of the fabric, in which recording is (to be) performed by using the water-based ink(s) is an application portion for the treatment agent. In a case that the treatment agent is applied to the part of the recording surface, the size of the application portion is preferably larger than the recording portion. For example, as depicted in FIG. 3A, in a case that an image of a letter "X" is printed on a fabric F, the treatment agent is preferably applied so that an application portion 30 is formed to have a line width which is larger than a line width of the letter. Further, as depicted in FIG. 3B, in a case that an image of a pattern is printed on the fabric F, the treatment agent is preferably applied so that an application portion 40 is formed to be larger than the pattern.

In the application of the treatment agent, an application amount of the treatment agent per an area of the fabric is, for example, in a range of 4.7 mg/cm$^2$ (30 mg/inch) to 50 mg/cm$^2$ (320 mg/inch$^2$). By making the application amount to be within the above-described range, the water resistance of the recorded matter (fabric) is further improved.

In a case that the recording medium is the fabric in the recording method of the present teaching, the recording method may further include drying of the applied treatment agent (a step for drying). By providing the step for drying, it is possible to suppress any blurring or bleeding in the recorded image. A time (timing) for performing the drying of the applied treatment agent is exemplified, for example, by a time (timing) before the recording, and a time (timing) after the recording; and the time before the recording is preferred. Note that in the recording method of the present teaching, whether or not to carry out the drying is arbitrary (optional), and it is allowable not to carry out the drying even in the case that the recording medium is the fabric.

The drying may be, for example, air drying (natural drying). Alternatively, the drying may be performed by using any commercially available drying mechanism such as an iron, a hot press machine, a dryer, an oven, a belt conveyer oven, an IR heater, etc. The drying temperature at a time of performing the drying is, for example, in a range of 130° C. to 220° C.; in a case that the fabric is cotton, the drying temperature at the time of performing the drying is preferably in a range of 180° C. to 210° C.; in a case that the fabric is polyester, the drying temperature at the time of performing the drying is preferably in a range of 140° C. to 160° C. The drying temperature may be, for example, either a temperature of the drying atmosphere or a setting temperature of the drying mechanism.

Figure 2:
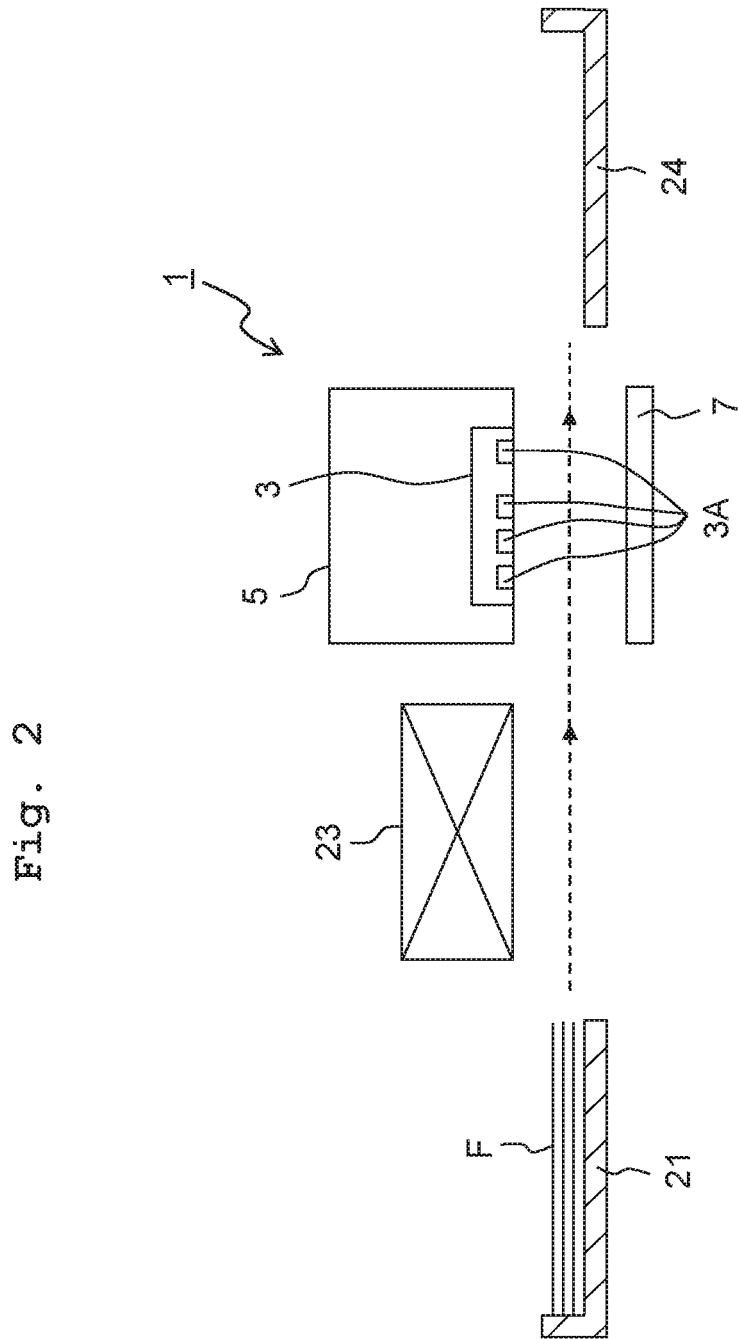
FIG. 2 is a schematic view of an example of the configuration of the ink-jet recording apparatus of the present teaching.

As depicted in FIG. 2, the drying may be performed by using a drying mechanism 23 provided on the ink-jet recording apparatus 1, as depicted in FIG. 1, of the present teaching. Parts or portion in FIG. 2 which are the same as those depicted in FIG. 1 are assigned with the same reference numerals. Note that in FIG. 2, reference numerals 21 and 24 indicate, respectively, a supply tray and a discharge tray of which illustration are omitted in FIG. 1; a reference numeral 3A indicates a plurality of nozzles formed in the lower surface of the ink-jet head 3. Further, the drying of the treatment agent may be performed at the outside of the ink-jet recording apparatus.

In the drying, it is allowable, for example, that the mass of the applied treatment agent is reduced to be not more than 50% by mass of the application amount at a time at which the treatment agent has been applied (application time), or that the mass of the applied treatment agent is reduced to be not more than 30% by mass of the application amount, of the treatment agent, at the application time. By making the mass of the treatment agent in the fabric after the drying to be within the above-described range, it is possible to further suppress any blurring or bleeding in the recorded image, thereby making it possible to furthermore improve the water resistance of the printer matter. The step for drying may be expressed also as a step for volatilizing a solvent in the treatment agent (for example, the water, the water-soluble organic solvent, etc.) and/or a step for reducing the mass of the treatment agent.

Next, the water-based ink(s) is (are) jetted from the ink-jet head 3 onto the recording medium to thereby perform recording on the recording medium (fabric). In this situation, in a case that selection is made so as to apply the treatment agent in the step for applying the treatment agent, the water-based ink is jetted onto the application portion to which the treatment agent has been applied.

In this embodiment, in the case that the application of the treatment agent is selected, the treatment agent is used as a pre-treatment agent which is to be applied to the fabric before performing jetting of the water-based ink. However, the present teaching is not limited to or restricted by this. In the present teaching, it is allowable that the water-based ink is jetted firstly onto the fabric, and then the treatment agent is applied to the fabric; alternatively, it is allowable that the application of the treatment agent to the fabric and the jetting of the water-based ink onto the fabric are performed at the same time. From the viewpoint of suppressing the blurring (bleeding) of the recorded image, it is preferred that the application of the treatment agent, the drying of the treatment agent, and the jetting of the water-based ink are performed in this order.

In a general recording method for performing recording on a fabric, a thermally fixing step for allowing the water-based ink to be thermally fixed to the fabric is performed after the recording. In the recording method of the present teaching, however, it is optional whether or not to carry out the thermally fixing step; in the recording method of the present teaching, it is allowable that the thermally fixing step is carried out, or is not carried out.

The recording medium P having the recording performed thereon in such a manner is discharged from the ink-jet recording apparatus 1. According to the present teaching, even in the case that the recording is performed on the fabric rather than on the recording paper P, it is possible to suppress the color loss after washing with water. It is presumed that this effect of suppressing color loss is obtained due to the following mechanism. Namely, the dye included in the water-based ink is generally anionic, and thus the electric charge of the dye is eliminated and made to be non-aqueous by the cationic urethane emulsion included in the treatment agent, which in turn increases the water resistance of the recorded matter (fabric). Further, according to the present teaching, the color change (difference between color of recorded matter of recording paper P and color of recorded matter of fabric) is small between a case that recording is performed on the recording paper and a case that recording is performed on the fabric. Generally, in the fabric, the degree or extent of penetration of the water-based ink in the depth direction is greater as compared with that in the recording paper. The difference in the degree of penetration of the water-based ink in the depth direction is presumed to be one of the reasons for causing the color change (difference in color) between the color of recorded matter of the recording paper and the color of recorded matter of the fabric. In the present teaching, it is presumed that the cationic urethane emulsion included in the treatment agent suppresses the penetration of the water-based ink in the depth direction of the recording medium (fabric), thereby making it possible to make the color change (difference in color) between the color of recorded matter of the recording paper and the color of recorded matter of the fabric small. Further, according to the present teaching, in the case that the recording is performed on the fabric, the change in texture or tactile sensation, such as feel by hand, feel by skin, etc., in the fabric is small between before and after the recording. The cationic polymer including the urethane structure in the cationic urethane emulsion, in particular, the cationic polymer including the ester-based urethane structure is capable of forming an elastic film when being dried. With this, it is assumed that any hardening of the fabric after having the treatment agent applied thereto is suppressed. However, this mechanism is merely an assumption, and the present teaching is not limited to or restricted by this assumed mechanism Note that in FIG. 1, the supply and discharge mechanisms for the recording medium P are omitted in the illustration of FIG. 1.

The apparatus depicted in FIG. 1 adopts the serial type ink-jet head. However, the present teaching is not limited to or restricted by this. The ink-jet recording apparatus may be an apparatus which adopts a line type ink-jet head.

In a case that the recording medium is the fabric, the recording method of the present teaching further includes washing of the fabric with water (a step for washing), and the washing may be performed after the recording. By providing the step for washing, it is possible to further improve the water resistance of the printer matter.

Next, an explanation will be given about an example of the recording method of the present teaching, in accordance with a flowchart indicated in FIG. 4. Note that the recording method which will be explained below is merely an example, and the present teaching is not limited to or restricted by this example. Firstly, depending on the kind of the recording medium (fabric or recording paper), selection of recording mode is performed (step S1 of FIG. 4). In a case that the recording medium is the fabric, the controller of the ink-jet apparatus selects a "first recording mode (fabric recording mode)"; on the other hand, in a case that the recording medium is the recording paper, the controller of the ink-jet recording apparatus selects a "second recording mode (recording paper recording mode 1)" or a "third recording mode (recording paper recording mode 2)". For example, the controller of the ink-jet recording apparatus may determine as to which one among the "first recording mode", the "second recording mode" and the "third recording mode" is to be performed, in accordance with (based on) a signal inputted from (via) a user interface. Alternatively, the controller may determine as to which one among the first recording mode, the second recording mode and the third recording mode is to be performed, in accordance with (based on) a flag corresponding to the mode selected on the user interface.

In a case that the first recording mode (fabric recording mode) is selected, the step for applying the treatment agent (step S2F of FIG. 4), the step for drying (step S3 of FIG. 4) and the step for recording (step S4F of FIG. 4) are performed in this order. It is allowable to further perform the step for washing (step S5 of FIG. 4) after the step for recording (step S4F of FIG. 4). On the other hand, in a case that the second recording mode (recording paper recording mode 1) is selected, the step for recording (step S4P-1 in FIG. 4) is performed, without performing the above-described step for applying the treatment agent and step for drying. In a case that the third recording mode (recording paper recording mode 2) is selected, the step for applying the treatment agent (step S2P of FIG. 4) and the step for recording (step S4P-2 of FIG. 4) are performed in this order.

The recording method of the present teaching as described above may be performed by using an ink-jet recording apparatus provided with the treatment agent applying mechanism and/or the drying mechanism, or may be performed by using an ink-jet recording apparatus which is not provided with the treatment-agent applying mechanism and/or the drying mechanism. In a case that the recording method is performed by using the ink-jet recording apparatus which is not provided with the treatment-agent applying mechanism and/or the drying mechanism, it is allowable, for example, that a user applies the treatment agent to the fabric and/or the recording paper by the spraying method, and/or that the user may dry the treatment agent applied to the fabric with an iron or a dryer.

[Recording Medium]

Next, an explanation will be given about a recording medium of the present teaching.

The recording medium of the present teaching is a recording medium including: a substrate (base material); and a covering layer formed on the base material, wherein the covering layer is formed by using the cationic urethane emulsion. Namely, the covering layer includes the cationic polymer including the urethane structure.

In the recording medium of the present teaching, the base material is exemplified, for example, fabric, recording paper, etc. The formation of the covering layer on the base material can be carried out, for example, similarly to the applying method for applying the treatment agent to the recording medium in the above-described recording method of the present teaching.

EXAMPLES

Next, Examples of the present teaching are explained together with Comparative Examples. Note that the present teaching is not limited to or restricted by Examples and Comparative Examples described below.

<Preparation of Water-Based Dye Ink>

Respective components of Water-based Ink Composition (TABLE 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus a water-based cyan dye inks C1 for ink-jet recording and a water-based cyan dye ink C2 for ink-jet recording were obtained.

Table 1 (Following)—Legend

*1: Nonionic surfactant; produced by NISSHIN CHEMICAL CO., LTD.; numerical values in Table 1 indicate active ingredient amounts.

*2: Anionic surfactant; produced by LION SPECIALTY CHEMICALS CO., LTD.; active ingredient amount: 28% by weight; numerical values in Table 1 indicate active ingredient amounts.

The unit of the ink composition is % by mass.

TABLE 1

|  |  |  | INKS | |
|---|---|---|---|---|
|  |  |  | C1 | C2 |
| Water-based Ink Composition (% by mass) | Dye | C.I. Direct Blue 199 | 4.00 | — |
|  |  | C.I. Acid Blue 90 | — | 4.00 |
|  | Humectant | Glycerol | 20.00 | 20.00 |
|  | Surfactant | OLFIN (trade name) E1010 (*1) | 0.20 | 0.20 |
|  |  | SUNNOL (trade name) NL1430 (*2) | 0.20 | 0.20 |
|  |  | Water | balance | balance |

Examples 1 to 11 and Comparative Examples 1 to 4

<Preparation of Treatment Agent>

Respective components of Treatment Agent Composition (TABLE 2) were mixed uniformly or homogeneously; and thus treatment agents respectively composing sets of inks and treatment agents of Examples 1 to 11 and Comparative Examples 1 to 4 were obtained.

As indicated in TABLE 2, sets of inks and treatment agents of Examples 1 to 11 and Comparative Examples 1 to 4 were obtained each by combining the water-based cyan ink C1 or C2, as indicated in TABLE 1, with one of treatments agents having the compositions as indicated in TABLE 2.

With respect to each of the sets of inks and treatment agents of Examples 1 to 11 and Comparative Examples 1 to 4, (a) Evaluation of image quality (color difference between recording paper and cotton), (b) Evaluation of fixing property (color difference between before and after washing with water in cotton), (c) Evaluation of tactile sensation (cotton), (d) Evaluation of image quality (color difference between recording paper and polyester), (e) Evaluation of fixing property (color difference between before and after washing with water in polyester), and (f) Evaluation of tactile sensation (polyester) were performed by the following methods, respectively.

(a) Evaluation of Image Quality (color difference between recording paper and cotton)
<Measurement of Color in Evaluation Sample of Recording Paper>

Evaluation samples of recording paper (recording paper evaluation samples) were prepared by recording single color patches of cyan on sheets of recording paper ("Super White+" produced by ASKUL CORPORATION) by using the water-based cyan dye inks included in the ink sets of inks and treatment agents of Examples 1 to 11 and Comparative Examples 1 to 4 by using an ink-jet printer-equipped digital multifunction machine DCP-J4225N produced by BROTHER INDUSTRIES, LTD. The colors ($L^*_1$, $a^*_1$, and $b^*_1$) of the respective single color patches of the evaluation samples of the recording paper were measured by a spectrophotometer Spectrolino produced by GRETAG MACBETH (measurement field: 2°; white reference: Abs (absolute white); light source: D50; density reference: ANSI T). Each of the $L^*_1$ value, the $a^*_1$ value and $b^*_1$ value is based on the L*a*b color system (CIE 1976 (L*a*b*) color system) normalized in 1976 by Commission Internationale d'Eclairage (CIE) (see JIS Z 8729). Each measurement result of the colors ($L^*_1$, $a^*_1$, and $b^*_1$) is an average value of those obtained by the measurement performed three times.

<Measurement of Color in Cotton Evaluation Sample>

1 g of the treatment agent composing each of the sets of the inks and the treatment agents of Examples 1 to 11 and Comparative Examples 1 to 4 was uniformly applied, by the spraying method, to cotton (sheeting) having a plane size of 15 cm×5 cm. Subsequently, the cotton after having the treatment agent applied thereto was dried for 2 minutes by using an iron set to a high temperature (in a range of 180° C. to 210° C.) of which upper limit temperature was 210° C. Next, after the cotton was dried, evaluation samples of cotton (cotton evaluation samples) were prepared each by recording a single color patch on the cotton, in a similar manner to the recording paper evaluation samples, by using the ink-jet printer-equipped digital multifunction machine DCP-J4225N. The colors ($L^*_2$, $a^*_2$, and $b^*_2$) of the respective single color patches of the evaluation samples were measured in a similar manner to the measurement for the evaluation samples of the recording paper.

<Calculation of Color Difference ($\Delta E_1$)>

Color difference ($\Delta E_1$) between the color of the evaluation sample of recording paper and the color of the evaluation sample of cotton was calculated by the following formula, and the evaluation was performed therefor in accordance with the following criterion for evaluation.

$$\Delta E_1 = \{(L^*_1 - L^*_2)^2 + (a^*_1 - a^*_2)^2 + (b^*_1 - b^*_2)^2\}^{1/2}$$

<Criterion for Evaluation of Image Quality (Color Difference Between Recording Paper and Cotton)>

A: Color difference ($\Delta E_1$) between the recording paper and the cotton was not more than 8.0.

B: Color difference ($\Delta E_1$) between the recording paper and the cotton exceeded 8.0 and was less than 16.0.

C: Color difference ($\Delta E_1$) between the recording paper and the cotton was not less than 16.0.

(b) Evaluation of Fixing Property (Color Difference Between Before and after Washing with Water in Cotton)

Each of the evaluation samples of cotton in (a) Evaluation of image quality (color difference between recording paper and cotton) was washed with water for 5 minutes while shaking the evaluation sample in the water to such an extent that a part of the evaluation sample was not rubbed with another part of the evaluation sample. After the washing with water, each of the evaluation samples was dried, and the colors ($L^*_3$, $a^*_3$, and $b^*_3$) of the respective single color patches of the evaluation samples obtained after the washing and the drying were measured in a similar manner as for the evaluation samples in (a) Evaluation of image quality (color difference between recording paper and cotton). Color difference ($\Delta E_2$) in each of the evaluation samples of cotton between before and after the washing with water was calculated by the following formula, and the evaluation was performed therefor in accordance with the following criterion for evaluation.

$$\Delta E_2 = \{(L^*_2 - L^*_3)^2 + (a^*_2 - a^*_3)^2 + (b^*_2 - b^*_3)^2\}^{1/2}$$

<Criterion for Evaluation of Fixing Property>

A: Color difference ($\Delta E_2$) between before and after the washing with water was not more than 8.0.

B: Color difference ($\Delta E_2$) between before and after the washing with water exceeded 8.0 and was less than 18.0.

C: Color difference ($\Delta E_2$) between before and after the washing with water was not less than 18.0.

(c) Evaluation of Tactile Sensation (Cotton)

Ten testees touched, with fingers, the evaluation sample of cotton in (a) Evaluation of image quality (color difference between recording paper and cotton), and the original cotton for which the application of the treatment agent and the jetting of the water-based cyan dye ink were not performed. The number of those, among the ten testees, who felt that the tactile sensation (feel by hand) of the evaluation sample of the cotton became hardened as compared with the original cotton was totaled, and evaluation was performed therefor in accordance with the following criterion for evaluation. Note that although in Example 5, (a) Evaluation of image quality (color difference between recording paper and cotton) used two kinds of the samples which were the evaluation sample using the water-based ink C1 and the evaluation sample using the water-based ink C2; in (c) Evaluation of Tactile sensation (cotton), only the evaluation sample using the water-based ink C1 was used.

<Criterion for Evaluation of Tactile Sensation>

AA: Not more than 1 testee among the ten testees felt that the tactile sensation (feel by hand) of the evaluation sample became hardened.

A: Two to four testees among the ten testees felt that the tactile sensation of the evaluation sample became hardened.

B: Five to Seven testees among the ten testees felt that the tactile sensation of the evaluation sample became hardened.

C: Not less than eight testees among the ten testees felt that the tactile sensation of the evaluation sample became hardened.

(d) Evaluation of Image Quality (Color Difference Between Recording Paper and Polyester)

Color difference ($\Delta E_3$) between the color of the evaluation sample of recording paper and the color of the evaluation sample of polyester ($L^*_4$, $a^*_4$, and $b^*_4$) was calculated by the following formula in a similar manner as in (a) Evaluation of Image Quality (color difference between recording paper and cotton), except that polyester twill having a same planer size as that of the cotton (sheeting) was used instead of using the cotton (sheeting), and that the temperature of the iron was set to a medium temperature (in a range of 140° C. to 160° C.) of which upper limit temperature was 160° C.; and the evaluation was performed therefor in accordance with the following criterion for evaluation.

$$\Delta E_3 = \{(L^*_1 - L^*_4)^2 (a^*_1 - a^*_4)^2 + (b^*_1 - b^*_4)^2\}^{1/2}$$

<Criterion for Evaluation of Image Quality (Color Difference Between Recording Paper and Polyester)>

A: Color difference ($\Delta E_3$) between the recording paper and the polyester was not more than 8.0.

B: Color difference ($\Delta E_3$) between the recording paper and the polyester exceeded 8.0 and was less than 16.0.

C: Color difference ($\Delta E_3$) between the recording paper and the polyester was not less than 16.0.

(e) Evaluation of Fixing Property (Color Difference Between Before and after Washing with Water in Polyester)

Each of the evaluation samples of polyester in (d) Evaluation of Image Quality (color difference between recording paper and polyester) was washed with water in a similar manner as in (b) Evaluation of Fixing Property (color difference between before and after washing with water in cotton). After the washing with water, each of the evaluation samples was dried, and the colors ($L^*_5$, $a^*_5$, and $b^*_5$) of the respective single color patches of the evaluation samples obtained after the washing and the drying were measured in a similar manner as for the evaluation sample in (a) Evaluation of Image Quality (color difference between recording paper and cotton). Color difference ($\Delta E_4$) in each of the evaluation samples of polyester between before and after the washing with water was calculated by the following formula, and the evaluation was performed therefor in accordance with the following criterion for evaluation.

$$\Delta E_4 = \{(L^*_4 - L^*_5)^2 (a^*_4 - a^*_5)^2 + (b^*_4 - b^*_5)^2\}^{1/2}$$

<Criterion for Evaluation of Fixing Property>

A: Color difference ($\Delta E_4$) between before and after the washing with water was not more than 8.0.

B: Color difference ($\Delta E_4$) between before and after the washing with water exceeded 8.0 and was less than 18.0.

C: Color difference ($\Delta E_4$) between before and after the washing with water was not less than 18.0.

(f) Evaluation of Tactile Sensation (Polyester)

Ten testees touched, with fingers, the evaluation sample of polyester in (d) Evaluation of Image Quality (color difference between recording paper and polyester), and the original polyester for which the application of the treatment agent and the jetting of the water-based cyan dye ink were not performed. The number of those, among the ten testees, who felt that the tactile sensation (feel by hand) of the polyester evaluation sample became hardened as compared with the original polyester was totaled, and evaluation was performed therefor in accordance with the following criterion for evaluation. Note that although in Example 5, (a) Evaluation of Image Quality (color difference between recording paper and cotton) used two kinds of the samples which were the evaluation sample using the water-based ink C1 and the evaluation sample using the water-based ink C2; in (f) Evaluation of Tactile sensation (polyester), only the evaluation sample using the water-based ink C1 was used.

<Evaluation Criterion for Evaluation of Tactile Sensation>

AA: Not more than 1 testee among the ten testees felt that the tactile sensation (feel by hand) of the evaluation sample became hardened.

A: Two to four testees among the ten testees felt that the tactile sensation of the evaluation sample became hardened.

B: Five to Seven testees among the ten testees felt that the tactile sensation of the evaluation sample became hardened.

C: Not less than eight testees among the ten testees felt that the tactile sensation of the evaluation sample became hardened.

TABLE 2 indicates the configuration of each of the treatment agents respectively composing the sets of inks and treatment agents of Examples 1 to 11 and Comparative Examples 1 to 4, and the evaluation result for each of the sets of Examples 1 to 11 and Comparative Examples 1 to 4.

Table 2 (Following)—Legend

*3: Cationic urethane acrylic emulsion (including the ester-based urethane structure); produced by JAPAN COATING RESIN CO., LTD.; numerical values in TABLE 2 indicate solid content amounts.

*4: Cationic urethane acrylic emulsion (including the ester-based urethane structure); produced by DAI-ICHI KOGYO SEIYAKU CO., LTD; numerical values in TABLE 2 indicate solid content amounts.

*5: Cationic urethane acrylic emulsion; produced by DAI-ICHI KOGYO SEIYAKU CO., LTD; numerical values in TABLE 2 indicate solid content amounts.

*6: Styrene acrylic emulsion; produced by JAPAN COATING RESIN CO., LTD.; numerical values in TABLE 2 indicate solid content amounts.

*7: Acrylic acid ester copolymer emulsion; produced by JAPAN COATING RESIN CO., LTD.; numerical values in TABLE 2 indicate solid content amounts.

*8: Numerical values in TABLE 2 indicate solid content amounts.

*9: Numerical values in TABLE 2 indicate solid content amounts.

*1: Nonionic surfactant produced by NISSAN CHEMICAL INDUSTRIES, LTD.; numerical values in TABLE 2 indicate active ingredient amounts.

*10: Cationic surfactant; numerical values in TABLE 2 indicate active ingredient amounts.

TABLE 2

| | | | | | EXAMPLES | | | | | |
|---|---|---|---|---|---|---|---|---|---|---|
| | | | | | 1 | 2 | 3 | 4 | 5 | 6 |
| Composition of treatment agent (% by mass) | Polymer emulsion | Cationic | MOWINYL (trade name) 6910 (*3) | | 2.00 | 2.50 | 4.00 | 5.00 | 10.00 | 15.00 |
| | | | SUPERFLEX (trade name) 620 (*4) | | — | — | — | — | — | — |
| | | | SUPERFLEX (trade name) 650 (*5) | | — | — | — | — | — | — |
| | | | MOWINYL (trade name) 6901 (*6) | | — | — | — | — | — | — |
| | | | MOWINYL (trade name) 7820 (*7) | | — | — | — | — | — | — |
| | | Anionic | SUPERFLEX (trade name) 470 (*8) | | — | — | — | — | — | — |
| | | | SUPERFLEX (trade name) 420 (*9) | | — | — | — | — | — | — |
| | Humectant | | Propylene glycol | | 20.00 | 20.00 | 20.00 | 20.00 | 20.00 | 20.00 |
| | Surfactant | | OLFINE (trade name) E1010 (*1) | | 0.50 | 0.50 | 0.50 | 0.50 | 0.50 | 0.50 |
| | | | Lauryltrimethyl ammonium sulfate (*10) | | — | — | — | — | — | — |
| | | | Water | | balance | balance | balance | balance | balance | balance |
| Evaluations | Image quality (color difference between recording paper and cotton) | | | Ink C1 | A | A | A | A | A | B |
| | | | | Ink C2 | — | — | — | — | A | — |
| | Fixing Property (color difference between before and after washing with water in cotton) | | | Ink C1 | B | A | A | A | A | A |
| | | | | Ink C2 | — | — | — | — | A | — |
| | Tactile sensation (cotton) | | | | AA | AA | AA | AA | AA | AA |
| | Image quality (color difference between recording paper and polyester) | | | Ink C1 | A | A | A | A | A | A |
| | | | | Ink C2 | — | — | — | — | A | — |
| | Fixing Property (color difference between before and after washing with water in polyester) | | | Ink C1 | B | B | A | A | A | A |
| | | | | Ink C2 | — | — | — | — | A | — |
| | Tactile sensation (polyester) | | | | AA | AA | AA | AA | AA | AA |

| | | | | | EXAMPLES | | | | |
|---|---|---|---|---|---|---|---|---|---|
| | | | | | 7 | 8 | 9 | 10 | 11 |
| Composition of treatment agent (% by mass) | Polymer emulsion | Cationic | MOWINYL (trade name) 6910 (*3) | | 20.00 | 25.00 | — | — | 4.0 |
| | | | SUPERFLEX (trade name) 620 (*4) | | — | — | 10.00 | — | — |
| | | | SUPERFLEX (trade name) 650 (*5) | | — | — | — | 10.00 | — |
| | | | MOWINYL (trade name) 6901 (*6) | | — | — | — | — | — |
| | | | MOWINYL (trade name) 7820 (*7) | | — | — | — | — | — |
| | | Anionic | SUPERFLEX (trade name) 470 (*8) | | — | — | — | — | — |
| | | | SUPERFLEX (trade name) 420 (*9) | | — | — | — | — | — |
| | Humectant | | Propylene glycol | | 20.00 | 20.00 | 20.00 | 20.00 | 20.00 |
| | Surfactant | | OLFINE (trade name) E1010 (*1) | | 0.50 | 0.50 | 0.50 | 0.50 | 0.50 |
| | | | Lauryltrimethyl ammonium sulfate (*10) | | — | — | — | — | 1.00 |
| | | | Water | | balance | balance | balance | balance | balance |
| Evaluations | Image quality (color difference between recording paper and cotton) | | | Ink C1 | B | B | B | A | A |
| | | | | Ink C2 | — | — | — | — | — |
| | Fixing Property (color difference between before and after washing with water in cotton) | | | Ink C1 | A | A | B | A | A |
| | | | | Ink C2 | — | — | — | — | — |
| | Tactile sensation (cotton) | | | | A | B | AA | A | AA |
| | Image quality (color difference between recording paper and polyester) | | | Ink C1 | A | A | A | A | A |
| | | | | Ink C2 | — | — | — | — | — |
| | Fixing Property (color difference between before and after washing with water in polyester) | | | Ink C1 | A | A | B | B | A |
| | | | | Ink C2 | — | — | — | — | — |
| | Tactile sensation (polyester) | | | | A | B | AA | A | AA |

TABLE 2-continued

|  |  |  |  | COMPARATIVE EXAPLES | | | |
|---|---|---|---|---|---|---|---|
|  |  |  |  | 1 | 2 | 3 | 4 |
| Composition of treatment agent (% by mass) | Polymer emulsion | Cationic | MOWINYL (trade name) 6910 (*3) | — | — | — | — |
|  |  |  | SUPERFLEX (trade name) 620 (*4) | — | — | — | — |
|  |  |  | SUPERFLEX (trade name) 650 (*5) | — | — | — | — |
|  |  |  | MOWINYL (trade name) 6901 (*6) | 10.00 | — | — | — |
|  |  |  | MOWINYL (trade name) 7820 (*7) | — | 10.00 | — | — |
|  |  | Anionic | SUPERFLEX (trade name) 470 (*8) | — | — | 10.00 | — |
|  |  |  | SUPERFLEX (trade name) 420 (*9) | — | — | — | 10.00 |
|  | Humectant |  | Propylene glycol | 20.00 | 20.00 | 20.00 | 20.00 |
|  | Surfactant |  | OLFINE (trade name) E1010 (*1) | 0.50 | 0.50 | 0.50 | 0.50 |
|  |  |  | Lauryltrimethyl ammonium sulfate (*10) | — | — | — | — |
|  |  |  | Water | balance | balance | balance | balance |
| Evaluations | Image quality (color difference between recording paper and cotton) |  | Ink C1 | C | A | A | A |
|  |  |  | Ink C2 | — | — | — | — |
|  | Fixing Property (color difference between before and after washing with water in cotton) |  | Ink C1 | B | B | C | C |
|  |  |  | Ink C2 | — | — | — | — |
|  | Tactile sensation (cotton) |  |  | C | C | AA | AA |
|  | Image quality (color difference between recording paper and polyester) |  | Ink C1 | C | B | B | C |
|  |  |  | Ink C2 | — | — | — | — |
|  | Fixing Property (color difference between before and after washing with water in polyester) |  | Ink C1 | B | B | C | C |
|  |  |  | Ink C2 | — | — | — | — |
|  | Tactile sensation (polyester) |  |  | C | C | AA | AA |

As indicated in TABLE 2, the results in the evaluations of the image quality, fixing property and tactile sensation were all satisfactory both regarding the cotton and polyester in each of Examples 1 to 11. Comparison will be made regarding Examples 1 to 8 having similar conditions, except for the content amount of the cationic urethane emulsion. In Examples 2 to 8 in each of which the content amount of the cationic urethane emulsion was not less than 2.5% by mass, the results of the evaluation of fixing property in cotton were more excellent as compared with that in Example 1 in which the content amount of the cationic urethane emulsion was less than 2.5% by mass. In Examples 1 to 7 in each of which the content amount of the cationic urethane emulsion was not more than 20% by mass, the results of the evaluation of tactile sensation both in the cotton and polyester were more excellent as compared with those in Example 8 in which the content amount of the cationic urethane emulsion exceeded 20% by mass. Comparison will be made regarding Examples 5 and 10 having similar conditions, except for the kind of the cationic urethane emulsion. In Example 5 in which the urethane structure of the cationic urethane emulsion was ester-based, the results of the evaluation of tactile sensation both in the cotton and polyester were more excellent as compared with those in Example 10 in which the urethane structure of the cationic urethane emulsion was not ester-based.

On the other hand, in Comparative Examples 1 and 2 each using the cationic styrene acrylic emulsion or cationic acrylic acid ester copolymer emulsion, instead of using the cationic urethane emulsion, the results of the tactile sensation both in the cotton and polyester were unsatisfactory. Further, in Comparative Examples 3 and 4 each using the anionic polymer emulsion, instead of using the cationic urethane emulsion, the results of the fixing property both in the cotton and polyester were unsatisfactory.

As described above, the set of the ink and the treatment agent of the present teaching is usable both for performing recording on the recording paper and on a recording medium which is different from the recording paper. Further, way of use or application of the set of the ink and the treatment agent of the present teaching is not particularly limited; the set of the ink and the treatment agent of the present teaching is applicable widely to a variety of kinds of the ink-jet recording.

What is claimed is:

1. A set comprising:
   a water-based ink for ink-jet recording including a dye and water; and
   a treatment agent including a cationic polymer emulsion which includes a cationic polymer including a urethane structure,
   wherein the treatment agent further includes a humectant including a polyvalent alcohol, the polyvalent alcohol being propylene glycol, and
   wherein the water-based ink does not contain any pigment.

2. The set according to claim 1, wherein the dye includes at least one of a direct dye and an acidic dye.

3. The set according to claim 1, wherein solid content amount of the cationic polymer emulsion in the entire amount of the treatment agent is in a range of 4% by mass to 20% by mass.

4. The set according to claim 1, wherein the cationic polymer includes an ester-based urethane structure.

5. A set comprising:
   a water-based ink for ink-jet recording including a dye and water; and
   a treatment agent including a cationic polymer emulsion which includes a cationic polymer including a urethane structure,
   wherein the treatment agent further includes a cationic surfactant and a nonionic surfactant, and
   wherein the water-based ink does not contain any pigment.

6. The set according to claim 1, wherein the cationic polymer further includes at least one of an acrylic structure and a styrene structure.

7. The set according to claim 1, wherein the treatment agent substantially does not include a cationic polymer emulsion which includes a cationic polymer not including urethane structure.

8. The set according to claim 1, wherein a solid content amount of a cationic polymer in an entire amount of the water-based ink is not more than a solid content amount of the cationic polymer emulsion in an entire amount of the treatment agent.

9. The set according to claim 1, wherein the treatment agent further includes a glycol-based water-soluble organic solvent of which boiling point is not more than 200° C.; and
- a content amount of the glycol-based water-soluble organic solvent of which boiling point is not more than 200° C. in an entire amount of the water-based ink is not more than a content amount of the glycol-based water-soluble organic solvent of which boiling point is not more than 200° C. in an entire amount of the treatment agent.

10. A recording method for recording on a recording medium which is fabric or recording paper by using the set as defined in claim 1, the recording method comprising, in a case that the recording medium is the fabric:
- applying the treatment agent to the fabric; and
- jetting the water-based ink onto the fabric by an ink-jet system.

11. The set according to claim 5, wherein the dye includes at least one of a direct dye and an acidic dye.

12. The set according to claim 5, wherein solid content amount of the cationic polymer emulsion in the entire amount of the treatment agent is in a range of 4% by mass to 20% by mass.

13. The set according to claim 5, wherein the cationic polymer includes an ester-based urethane structure.

14. The set according to claim 5, wherein the treatment agent further includes a humectant comprising a polyvalent alcohol, the polyvalent alcohol being propylene glycol.

15. The set according to claim 5, wherein the cationic polymer further includes at least one of an acrylic structure and a styrene structure.

16. The set according to claim 5, wherein the treatment agent substantially does not include a cationic polymer emulsion which includes a cationic polymer not including urethane structure.

17. The set according to claim 5, wherein a solid content amount of a cationic polymer in an entire amount of the water-based ink is not more than a solid content amount of the cationic polymer emulsion in an entire amount of the treatment agent.

18. The set according to claim 5, wherein the treatment agent further includes a glycol-based water-soluble organic solvent of which boiling point is not more than 200° C.; and
- a content amount of the glycol-based water-soluble organic solvent of which boiling point is not more than 200° C. in an entire amount of the water-based ink is not more than a content amount of the glycol-based water-soluble organic solvent of which boiling point is not more than 200° C. in an entire amount of the treatment agent.

19. A recording method for recording on a recording medium which is fabric or recording paper by using the set as defined in claim 5, the recording method comprising, in a case that the recording medium is the fabric:
- applying the treatment agent to the fabric; and
- jetting the water-based ink onto the fabric by an ink-jet system.

* * * * *